Patented Aug. 14, 1951

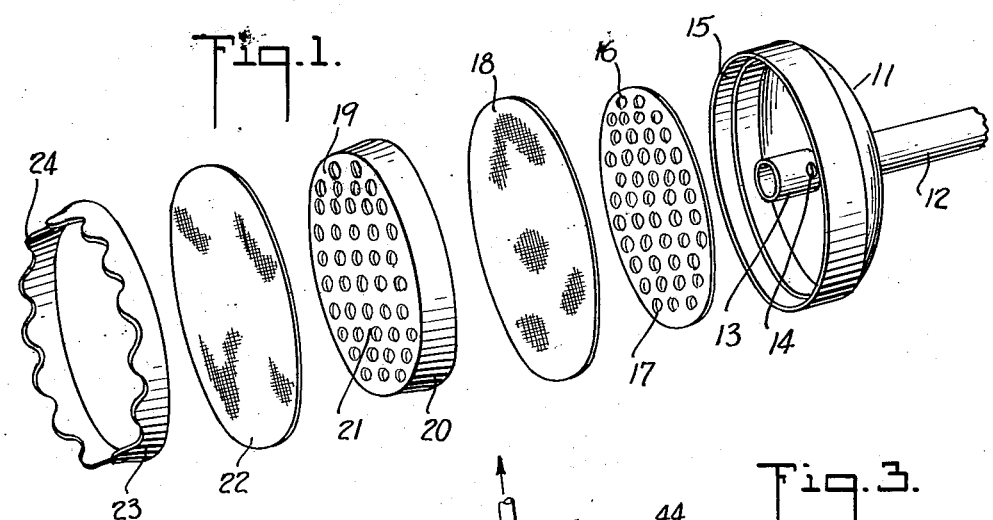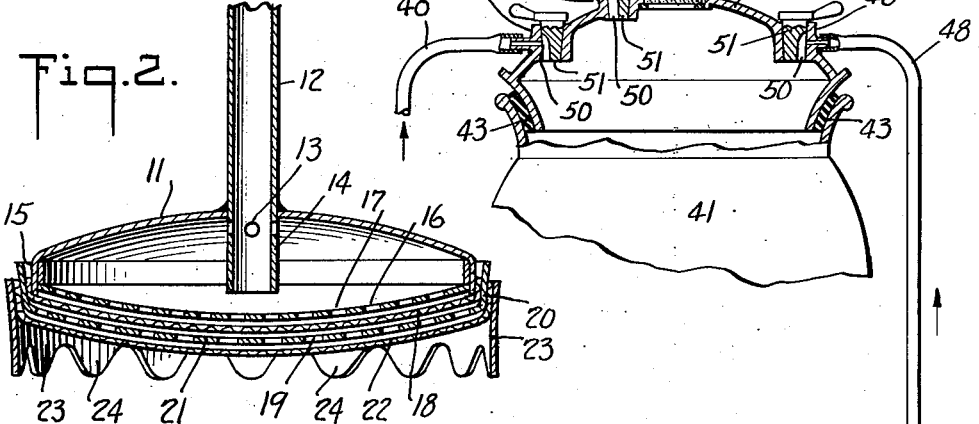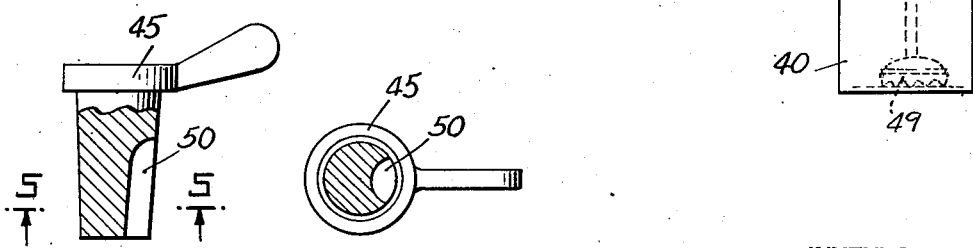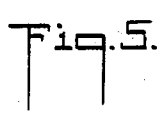

2,564,174

UNITED STATES PATENT OFFICE 2,564,174

VACUUM FILTER

Michael Roman, Lowville, N. Y., assignor to Russell D. Hay and Robert W. Banta, both of Penn Yan, N. Y.

Application October 29, 1948, Serial No. 57,321

5 Claims. (Cl. 210—170)

My invention relates more particularly to an improved method of filtering milk but it may be used for certain other filterable liquids, and has for its object the production of a filter head adapted to support certain flexible and fibrous filtering material and to provide a construction so as to prevent any by-pass of the filterable material around the filter proper.

Another object of this invention is to provide an assembly of filter supporting members telescopically interfitting, using the edges of the slightly oversized filtering material as gaskets to insure tight seal at all joining parts of the filter head.

My invention is especially adapted for use by those producers who have milking machines and thus have a source of vacuum available. Due to the peculiar nature of milk with its tendency to have a sealing effect upon filtering materials in gravity flow filtration, one of the objects of this invention is to provide a strainer apparatus in which a vacuum can be created thereby exerting a pressure greater than atmospheric, which would thereby make practical the use of thicker, heavier and more efficient filtering materials and in which the sealing effect will be of no consequence.

A further object is to provide an economical filtering head assembly in which the filtering material can be properly placed and/or centered and locked in place to eliminate any by-pass of milk without filtration, at the same time to produce a structure that is easily assembled and unassembled for sterilization and/or cleaning.

The foregoing and other features of my invention will now be described in connection with the accompanying drawings forming part of this specification in which I have illustrated my invention in its preferred form, after which I shall point out in the claims those features which I believe to be new and of my own invention.

In the drawings:

Figure 1 is an extended or blown up view of my filtering head showing the relation of the assembled parts in perspective.

Figure 2 is a sectional view of the filtering head, showing the parts illustrated in Figure 1 in assembled position.

Figure 3 is a diagrammatic assembly of the apparatus connected in operating position.

Figures 4 and 5 are details of the shut off valves which I may employ in the head of the container which receives the filtered liquid.

In the carrying out of my invention I employ a funnel shaped member 11 provided with an outlet 12 at the apex or center of the funnel portion, said outlet pipe extending well into the funnel as at 13 and provided with one or more holes 14 in the side of the extension close to the body portion of the funnel 11. Near the outer rim of the funnel I provide a recess 15 adapted to position a supporting disk 16 which is punctured over all with holes 17. This disk may be dish shaped, the object of which is to support the filter material so as to bridge over the central opening of the extension 13.

Over the supporting disk 16, I provide my filtering material 18. The diameter of this filtering material 18 should preferably be sufficiently larger than the filter support 16 so that the outer edge thereof can serve as a gasket when the strainer head 19 interfits with the funnel, thus sealing the joint so as to prevent unfiltered liquid from entering the funnel. This strainer head consists mainly of a ring 20 having a perforated bottom 21 slightly dished. The diameter of the ring 20 closely engages the funnel rim in interfitting engagement.

To make my filter head more efficient I provide a second disk of flexible filtering material 22 which is clamped over the strainer head ring 20 by means of a clamping ring 23. Here again the disk of filter material is larger in diameter than the strainer head so that the outer portion of the filter material can be utilized as a gasket.

The ring 23 has a serrated edge 24 so as to hold the filter above the bottom of the container from which the milk is being drawn by suction of the vacuum, thus preventing the formation of a vacuum in the filter head and stopping the flow of filtered material at that point. This ring should be of sufficient depth for holding liquids when poured into it when held in upright position, that is a position opposite to that shown in Figure 3.

The assembly which I preferably employ is illustrated diagrammatically in Figure 3 in which 40 are pails containing the liquid to be strained, 41 illustrates a container into which the strained liquid is to be accumulated.

On top of the container 41 I provide a closure head 42 sealed with a removable gasket 43 to the head of the container so as to make the container 41 vacuum tight and readily provide for sterilization of head and gasket. This head is preferably made of transparent plastic so as to make it possible to see the flow of the liquid and observe the progress in the filtering of the contents. In case I may decide to make this head out of an opaque material or metal, a window 52 (shown in dotted lines) must be provided for visibility.

It will be observed that the closure head 42 is dome shape. I have discovered that with this shape it is less likely that the spray from the filtering liquid would cloud the visibility.

In the head 42 I provide a plurality of valves 46 piped to several strainers 49 by means of flexible piping 48. I also provide a valve 45 which is connected to a source of vacuum (not shown).

All valves 45, 46 are tapered type valves having a cut-away portion 50 in the tapered shank 51, adapted to co-act with hole in the plug body to permit flow of liquid and cut it off at will.

When the vacuum is created in the container 41 by opening valve 45, the liquid from pails 40 is immediately sucked up through the filter heads 49 which rest on their serrated rims against bottom of the pails in each case. The amount of milk in the container 41 may be observed as well as the flow of milk through the filtering line 48 as will be readily understood.

It will be readily understood that the filter head may be held in an upright position, inverted from that shown in Figure 3, and milk poured into the rim 23 if desired. It is particularly necessary to have the depth of this rim sufficient to contain a quantity of milk because there is always an amount of milk left in the pail which does not respond to the vacuum pull. Much milk may be saved in this manner. The holes 14 permit all of the filtered milk entering the funnel 11 to pass through the pipe 12 to the container 41.

I wish it distinctly understood that my filter head herein illustrated and described is in the form in which I desire to construct it and that changes or variations may be made as may be convenient or desirable without departing from the salient features of my invention and I therefore intend the following claims to cover such modifications as naturally fall within the lines of invention.

I claim:

1. A filter head for vacuum filtering comprising, a funnel shaped member having its outlet conduit connected to a vacuum line, said outlet conduit extending into the interior of the funnel substantially to the plane of the rim and provided with an opening in the outlet on the inside of the funnel adjacent the bottom thereof, the outer rim of the funnel provided with a recess formed on the inner side thereof, a perforated filter support adapted to seat in the recess and bridge over the end of the outlet conduit, a disk of filtering material larger in diameter than the diameter of the filter support, said filtering material held in position over the support by a strainer head having a perforated disk with an integral peripheral ring adapted to fit over the recess of the funnel thereby clamping the said filter material to outside rim of the funnel, the outer edge of filtering material acting as a gasket to seal the joint between the support and funnel.

2. A filter head for filtering liquid comprising, a funnel shaped member having its outlet conduit extending into the interior of the funnel substantially to the plane of the rim and provided with an opening in the outlet on the inside of the funnel adjacent the bottom thereof, the outer rim of the funnel provided with a seat on the inner side thereof adapted to receive and support a perforated filter support so that the support bridges over the end of the outlet conduit, a perforated filter support adapted to support a disk of filter material above the end of the outlet, a disk of filtering material larger in diameter than the diameter of the filter support, said filtering material held in position over the support by a strainer head having an integral perforated disk with a peripheral ring adapted to fit over the recess of the funnel with the outer edge of the filtering material clamped externally to the funnel and acting as a gasket to seal the joint between the support and funnel, a second disk of filtering material clamped over the strainer head by means of a flared ring having serrated edges, the outer edges of the filtering material acting as a gasket to seal the joint between the ring and the strainer head.

3. Apparatus for filtering milk by means of a vacuum comprising a container having a head connected to a source of vacuum and an intake connected to a filter head comprising a filter head for filtering liquid, comprising a funnel shaped member having its outlet conduit extending into the interior of the funnel substantially to the plane of the rim and provided with an opening in the outlet on the inside of the funnel adjacent the bottom thereof, the outer rim of the funnel provided with a seat on the inner side thereof adapted to receive and support a perforated filter support so that the support bridges over the end of the outlet, a perforated filter support adapted to support a disk of filter material above the end of the outlet, a disk of filtering material larger in diameter than the diameter of the filter support, said filtering material clamped externally in position over the support by a strainer head having a perforated disk with a peripheral ring adapted to telescope with the funnel with the outer edge of the filtering material acting as a gasket to seal the joint between the support and funnel, a second disk of filtering material clamped over the strainer head by means of a flared ring having serrated edges, the outer edges of the filtering material acting as a gasket to seal the joint between the ring and the strainer head.

4. The device of claim 2 in which the flared ring is provided with serrated outer edges and of sufficient depth to hold liquids when the assembly is held in upright position.

5. The device of claim 3 in which the container head is of transparent material and dome shaped whereby the spray caused by the filtering liquid is prevented from clouding the visibility.

MICHAEL ROMAN.

REFERENCES CITED

The following references are of record in the file of this patent:

UNITED STATES PATENTS

| Number | Name | Date |
|--------|------|------|
| 246,880 | Hamilton | Sept. 13, 1881 |
| 734,890 | Knight | July 28, 1903 |
| 794,107 | Knight | July 4, 1905 |
| 807,547 | Fliegel | Dec. 19, 1905 |
| 919,431 | Horne | Apr. 27, 1909 |